United States Patent [19]

Perlman

[11] Patent Number: 4,975,575
[45] Date of Patent: Dec. 4, 1990

[54] METHOD OF AND APPARATUS FOR DETECTING RADON

[75] Inventor: Daniel Perlman, Arlington, Mass.

[73] Assignee: Brandeis University, Waltham, Mass.

[21] Appl. No.: 96,136

[22] Filed: Sep. 11, 1987

Related U.S. Application Data

[63] Continuation-in-part of Ser. No. 32,745, Mar. 31, 1987.

[51] Int. Cl.[5] .............................................. G01V 5/00
[52] U.S. Cl. .................................... 250/255; 250/253
[58] Field of Search ................................. 250/253, 255

[56] References Cited

U.S. PATENT DOCUMENTS

| | | | |
|---|---|---|---|
| 2,337,306 | 12/1943 | Barnes | 250/83.6 |
| 3,438,241 | 4/1969 | McKinley | 73/23 |
| 3,784,674 | 1/1974 | Stein | 423/249 |
| 3,940,471 | 2/1976 | Favre | 423/249 |
| 4,055,762 | 10/1977 | Durkin | 250/370 A |
| 4,104,523 | 8/1978 | Wolfert | 350/370 A |
| 4,277,259 | 7/1981 | Rounbehler et al. | 55/270 |
| 4,327,575 | 5/1982 | Locker | 73/23 |
| 4,423,005 | 12/1983 | Murtaugh et al. | 422/61 |
| 4,700,070 | 10/1987 | Kovac | 250/304 |
| 4,801,800 | 1/1989 | Schieble | 250/255 |

OTHER PUBLICATIONS

Breslin et al, "An Improved-Time-Integr. Radon Mon NEA Specialist Meeting on Dosimetry ... for Radon", Paris, Nov. 20–22, 1978.

Freeman et al, "Radon Flux Meas. ...", Conference: Indoor Radon-Feb.-1986, Air Pollution Control Assoc., Pittsburgh, PA 15230.

H. M. Prichard & K. Marlen, Desorption of Radon from Activated Carbon into a Liquid Scintillator, 1983, 155–157.

A. C. George, Passive, Intergrated Measurement of Indoor Radon Using Activated Carbon, 1984, 867–872.

H. M. Prichard & K. Marien, A Passive Diffusion $^{222}$Rn Sampler Based on Activated Carbon Adsorption, 1985, 797–803.

B. L. Cohen & R. Nason, A Diffusion Barrier Charcoal Adsorption Collector For Measuring Rn Concentrations in Indoor Air, 1986, 457–463.

Bernard L. Cohen & Richard Nason, A Diffusion Barrier Charcoal Adsorption Collector for Measuring Rn Concentrations in Indoor Air, 1986, pp. 457–463.

J. B. Wadach & C. T. Hess, Radon-222 Concentration Measurements in Soil Using Liquid Scintillation and Track Etch, 1984, pp. 805–808.

*Primary Examiner*—Janice A. Howell
*Assistant Examiner*—Richard Hanig
*Attorney, Agent, or Firm*—Hamilton, Brook, Smith & Reynolds

[57] ABSTRACT

A method of and apparatus for measuring radon concentration in air involving the provision of a detector containing an adsorbent of radon and a desiccant. The desiccant can selectively retain an amount of water weighing from about 25% to about 50% of the weight of the adsorbent. The detector is exposed to a finite air space to be measured for a predetermined time period. The radon is liberated from the adsorbent so that the alpha particles and beta particles, which are the signature of radon radioactivity, are counted by liquid scintillation technique. The air may be pumped through the apparatus to hasten the radon adsorption process.

17 Claims, 10 Drawing Sheets

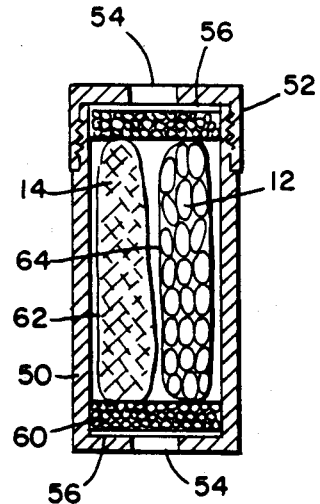
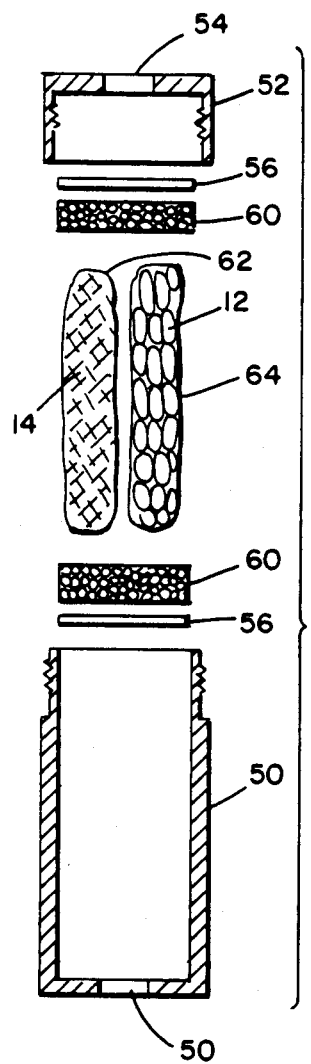
FIG. 8
FIG. 8A

METHOD OF AND APPARATUS FOR DETECTING RADON

This application is a continuation-in-part of U.S. application Ser. No. 032,745, filed Mar. 31, 1987, for Method of and Passive Apparatus for Detecting Radon, in the name of Daniel Perlman, which application is made a part hereof and incorporated by reference herein.

FIELD OF THE INVENTION

This invention relates to the detection and quantitative measurement of the radioactive isotope of radon, $^{222}Rn$, as encountered in air as in typical public and private buildings. It relates to a passive detection system in which a radon adsorbent accumulates the radon by diffusion at the test site and the analysis is carried out by liquid scintillation techniques in a laboratory instrument. It also relates to an active detection system in which the ambient atmosphere is pumped through a radon adsorbent causing rapid equilibrium adsorption of the radon.

BACKGROUND OF THE INVENTION $^{222}Rn$ is a radioactive decay product of $^{238}U$ which occurs naturally in the earth's crust and especially in granite rocks. $^{222}Rn$ is often referred to simply as "radon" and that terminology will hereinafter be employed. That is, radon, as herein used, is defined to mean the specific isotope $^{222}Rn$ which has a half-life of 3.82 days, decaying predominantly to the isotope $^{218}Po$ with the emission of an alpha particle of 5.49 MeV of energy.

Radon is the heaviest of the inert gases, the end of the series beginning with helium and neon. When produced, it has the properties and the lifetime to diffuse out the minerals in which it forms and becomes a constituent of the air we breathe. Techniques for its collection and measurement date from its discovery in 1902. Private and public actions to understand and alleviate, ameliorate, or mitigate the problem require accurate measurements of the radon concentration in buildings. The effectiveness of charcoal to adsorb radon has been known since around 1910. However, only one paper: H. M. Prichard and K. D. Marien, "Desorption of radon from activated Carbon into a Liquid Scintillator," *Analytical Chemistry* 55, 155-157, 1983, describes the use of liquid scintillation counting techniques to measure the radon adsorbed in the charcoal. Liquid scintillation counting of radon makes use of the fact that the radon can be eluted from the charcoal into a solvent such as toluene or xylene since these chemicals have a far greater affinity for radon than does charcoal. A scintillation liquid such as Econofluor, available from Dupont DeNemours and Co., containing PPO-POPOP scintillants, for example, can be added to the elutant such as toluene so that each ionization event in the counting liquid results in a pulse of light which can be detected in a photomultiplier photon counter. The pulses can then be analyzed by techniques well known in the art.

Prichard and Marien recognize that moisture uptake by the charcoal can be a problem but do not consider ways to solve the problems of moisture on the measurements of the radon. Hereinafter, there will be described practical devices for effectively using the liquid scintillation technique for measuring radon concentration in activated charcoal exposed in domestic and commercial buildings. Particularly there will be described devices which reduce and eliminate the moisture uptake problems which seriously compromise the use of activated charcoal for radon adsorption.

The complex chain of radioactive decay events which follows the decay of radon explains why the liquid scintillation technique is inherently 2.5 times more effective than the almost universally used gamma ray techniques for measuring the radon in charcoal. Examination of the practicalities of gamma ray measurements of radon in charcoal shows that liquid scintillation counting of the alpha and beta particles has additional advantages which make liquid scintillation at least 25 and generally almost 100 times more effective than gamma ray measurements.

Radon, being inert, is not itself considered a health hazard. The harmful effects result mainly from the decay radiations from the progeny of the radon, all of which are chemically very active. There are five sequential decays which occur in the first few hours following the decay of $^{222}Ra$. The immediate daughter of $^{222}Ra$ is $^{218}Po$ which transmutes in 3.05 minutes into $^{214}Pb$ by emitting a 6.0 MeV alpha particle. $^{214}Pb$ decays in turn with a half-life of 26.8 minutes, with the emission of an electron and a gamma ray, to an isotope of bismuth, $^{214}Bi$, which itself decays to $^{214}Po$ in 19.8 minutes by emitting an electron and a gamma ray. Finally, $^{214}Po$ decays in 164 microsecs by emitting a 7.687 MeV alpha particle. In summary, a sequence of short-lived transmutations takes place following each radon decay, and each step yields easily detectable radiation. In a matter of hours, three alpha particles, two electrons, and about two gamma rays are emitted for every radon decay. Thus, liquid scintillation (measuring both alpha and beta particles) can detect at least 2.5 times as many events as can gamma counters.

The dangers posed by the radiations emitted when radon decays have prompted the United States Environmental Protection Agency to issue guidelines for the levels of radon in air permissible under various circumstances. In domestic environments, an average yearly radon concentration exceeding 4 picoCuries per liter of air (4 pC/l) is considered cause for concern. A picoCurie is $3.7 \times 10^{-2}$ disintegrations per second, or $3.7 \times 10^{-2}$ Bq, where Bq is the symbol for a Bequeral, defined as one disintegration per second.

It is convenient to divide the methods and devices which have been developed for the detection of low levels of radon into passive and active. The passive methods make use of passive gas diffusion into any one of a variety of devices, so as to accumulate the radon or accumulate the effects of the radon emanations, for later measurement or analysis. Active methods have an active component at the test site. The component may be the gatherer device for the radon, it may be the electronic detector of the radon, it may, and generally does have both an active gatherer and an active detector.

The passive methods and devices accumulate the radon, or effects resulting from the radon emanations, by passive diffusion of the ambient radon-bearing air into the accumulator. Measurements are made in a laboratory environment. For example, plastic track detectors accumulate track evidence for the number of alpha particles emitted in the decay of radon over a period of time. Plastic track detectors are still marketed but represent a fraction of the market. The overwhelming share of the passive radon detection market uses charcoal to accumulate the radon, and gamma ray detection techniques to measure the radon concentration.

The gamma rays emitted in the third and fourth links of the radon decay chain, i.e., from the decays of $^{214}$Pb and $^{214}$Bi, give a unique measure of the radon content. In this prior art method, a canister (or bag) containing 25 grams or more or charcoal is exposed to radon bearing air. The charcoal container is designed so that the accumulation takes place over a time comparable to the 3.8 day lifetime of radon. After exposure, the charcoal container is placed in front of a gamma ray counter, usually a NaI(Tl) detector, which records the integrated gamma ray emissions. The method has several advantages: First, large amounts of charcoal can be used, since the gamma rays can penetrate many centimeters of charcoal without being attenuated. Second, because the gamma rays can penetrate out of their thin walled container, the charcoal need not be disturbed to make the measurement, and the canisters can be recycled. Third, the counting techniques are simple and well-known in the art. There are, however, serious disadvantages to the technique. First, only two of the five links in the radon decay chain are detected so that significant radon signal is ignored. Second, the gamma ray detectors used for the commercial measurement of radon have rather low efficiently; ten percent efficiently is typical. Third, the gamma ray detectors have significant backgrounds unrelated to the radon signals; increasing the detector size to improve the efficiency of detection leads to even greater increases in background counts. Fourth, humidity problems can seriously compromise the accuracy of the measurements since moisture uptake displaces the radon accumulated in the charcoal. It is difficult to maintain the dryness of the large amounts of charcoal under humid conditions, and no marketed canister has solved this problem.

SUMMARY OF THE INVENTION

The invention resides in a method of measuring radon concentration in air in a particular area to be measured comprising providing a detector containing a passive adsorbent of radon and a desiccant whose weight is at least comparable to the weight of adsorbent. The detector is exposed to air to be measured for a predetermined time period. The radon is then liberated from the passive adsorbent so that the alpha particles and beta particles, which are the signature of radon radioactivity, are counted by liquid scintillation techniques.

The invention also resides in a passive diffusion device for measuring the intensity of radioactive radon concentrations in ambient air. The device has an adsorbent of radon in a container with one or more diffusion openings. The improvement comprises primarily juxtapositioning the adsorbent with a desiccant of a sufficient quantity to keep the adsorbent substantially moisture free for between one day and one week, during which time the device is exposed to radon under relative humidity conditions which may range from zero to 100%.

The juxtapositioned desiccant may be placed between the diffusion openings and the adsorbent so that the radioactive radon must pass through the desiccant on its way the the adsorbent. In a preferred embodiment, the juxtapositioned desiccant is placed next to the adsorbent so that the radioactive radon entering the passive diffusion device is exposed to both desiccant and adsorbent simultaneously.

In another preferred embodiment, the juxtapositioned desiccant is placed behind the adsorbent, so that the ambient air, which is laden with radioactive radon first enters the adsorbent and the weight of desiccant behind the adsorbent is sufficient to pull the moisture out of the adsorbent during the period of exposure to the ambient air.

The device may contain a substantially contamination-free granular radon absorbent in a premeasured amount, which can be transferred to and counted in a commercial liquid scintillation counter vial holding a maximum volume of about 25 ml.

The adsorbent in the device may comprise between from about 0.5 to about 5.0 g of activated charcoal.

The adsorbent is preferably packaged separately from the desiccant and may be packaged in a rigid or flexible container, which container is gas and liquid permeable to permit both gas adsorption and liquid scintillant counting solution desorption of the radon from the adsorbent.

The container holding the desiccant and the adsorbent is preferably chemically unreactive with the chemical components in the liquid scintillator counting solution. The container may be translucent or transparent to the photons generated by the liquid scintillant solution so that the photons are counted by the liquid scintillation counter.

The desiccant may comprise either granular anhydrous silica gel, anhydrous $CaSO_4$ or other granular moisture adsorbent which, while retaining water, is non-deliquescent.

The device may have air convection barriers in the diffusion openings, which said barriers comprise a substantially moisture-insensitive radon-permeable membrane which may consist of paper, filter paper, hydrophobic filter paper or equivalents.

In its broader sense, the invention relates to a passive diffusion device which contains at least one opening through which a constituent of a gas mixture may pass. Because the gas mixture contains moisture, and moisture interferes with adsorption of the constituent in an adsorbent within the device, there is a need to reduce or eliminate the moisture uptake in the absorbent. The invention particularly relates to the use of a desiccant juxtapositioned with the adsorbent so that the moisture-laden gas is exposed to both the desiccant and the absorbent simultaneously and the desiccant is present in sufficient quantity to keep the adsorbent substantially moisture-free during the period of testing under relative humidity conditions which range from zero to 100%. In another embodiment of the invention, the desiccant is placed behind the adsorbent relative to the air flow so that the moisture-laden gas or air is first exposed to the adsorbent, and the desiccant is present in a sufficient quantity to pull the moisture from the adsorbent to maintain the adsorbent substantially moisture-free during the period of testing under relative humidity conditions ranging from 0 to 100%.

The above, and other features of the invention, including various novel details of construction and combinations of parts will now be more particularly described with reference to the accompanying drawings and pointed out in the claims. It will be understood that the particular method of and passive apparatus for detecting radon, which embody the invention, are shown and described by way of illustration only, and not as a limitation of the invention. The principles and features of this invention may be employed in varied and numerous embodiments without departing from the scope of the invention.

An active radon detection device is also disclosed which comprises an equilibrium adsorption material for monitoring radon levels. It includes a gas permeable holding means for the adsorbent and an air pump for propelling ambient atmosphere through the adsorbent which is located in the holding means. It also includes a gas flow connecting means by which the ambient atmosphere flows through the air pump.

A desiccant material and desiccant holding means are included to remove ambient moisture from the pumped atmosphere and wherein the desiccant and the holding means are connected in series with the adsorbent in its holding means, with the desiccant located upstream with respect to the flow of the atmosphere. The adsorbent may be activated charcoal and the desiccant may be silica gel or anhydrous $CaSO_4$. The granules of the charcoal are greater than 0.5 mm and less than 5 mm. They are contained in a walled container having porous or mesh-like ends, which are large enough to allow continuous air flow but small enough to prevent the charcoal from passing through the pores.

This method includes the steps of placing the container having the equilibrium adsorption material and the adsorbent in a building or other finite volume of air, forcing air through the container for a period of time sufficient to equilibrate the random adsorbent in the container and then counting the radioactivity of the adsorbent. The radioactivity may be detected by using liquid scintillation counting or gamma ray counting.

BRIEF DESCRIPTION OF THE FIGURES

FIGS. 7 and 7A are sectional views in assembled and in exploded form respectively of another embodiment of a passive diffusion radon detector.

FIGS. 8 and 8A are sectional views assembled and in exploded form respectively of yet another embodiment of a passive diffusion device embodying the invention.

THE METHOD

Figure 1:
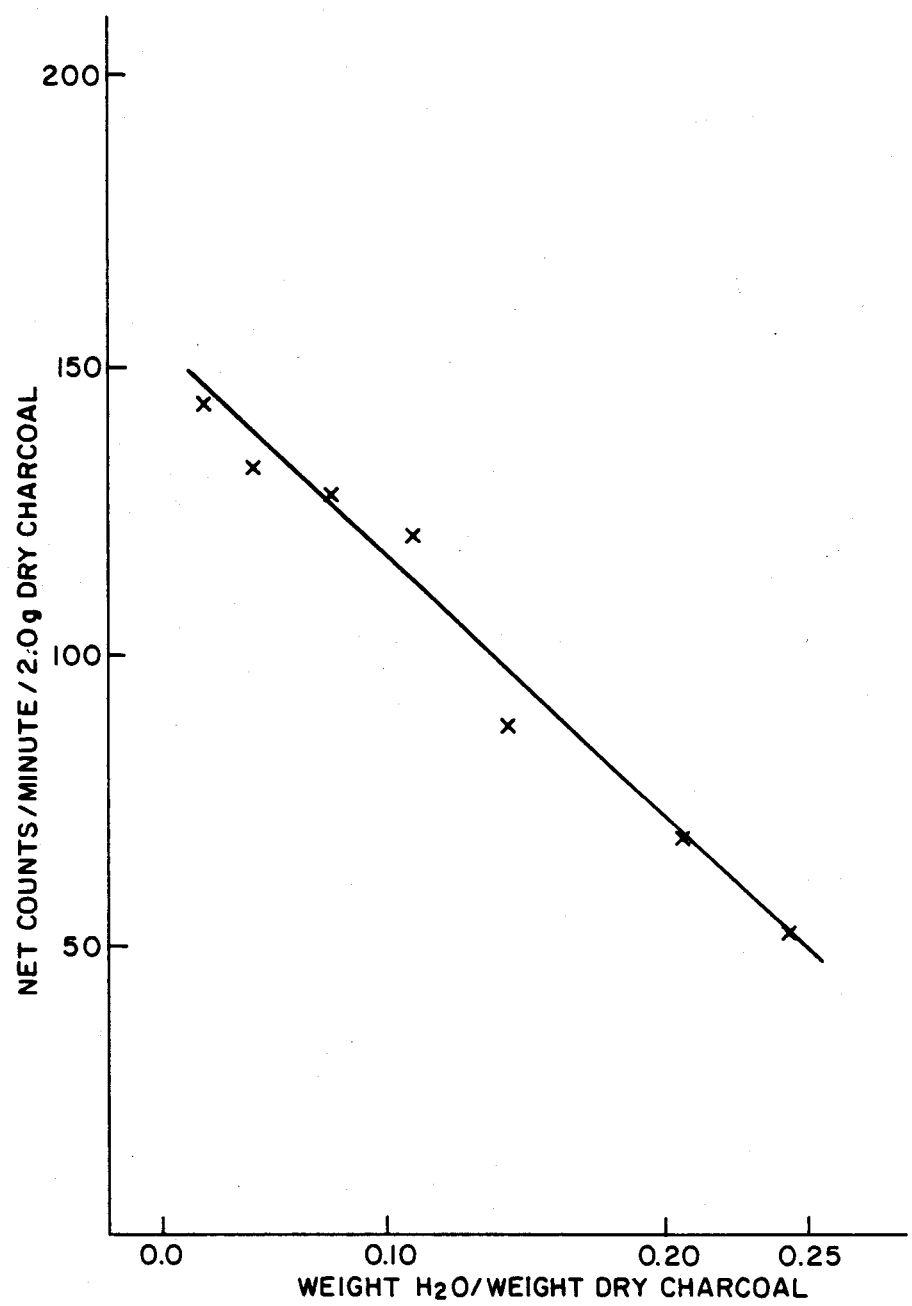
FIG. 1 is a graph showing the maximum amount of radon which can be adsorbed from air containing approximately 2.0 pCi/l radon, by two grams of dry activated charcoal plotted as a function of the weight percent of moisture uptake.

All of the disadvantages of gamma ray detection are offset if the radon in the charcoal is measured by liquid scintillation counter (LSC) techniques. The advantages of LSC techniques are gained at the cost of added complexity in handling the radon accumulators but, as will be shown, this is a small cost compared to the three primary advantages gained: First, the resulting detector is smaller in size by as much as a factor of ten. Second, the resulting detector has a least five times the sensitivity of the present gamma ray detection canisters. Third, the resulting detector can be made impervious to the sever problems of high humidity. Until now, the LSC method itself has only been a laboratory tool. That laboratory tool has been adapted for commercial purposes and in doing so new and surprising innovations have been made. The complete technique of LSC counting of radon in charcoal is described hereinafter often omitting the use of desiccants to eliminate moisture uptake. It is emphasized that the following technique, without the use of desiccants meets the U.S. Government's Environmental Protection Agency's Radon Proficiency tests.

Two grams of clean substantially dust-free activated charcoal can be obtained from commercial sources which package the charcoal for the food and drug industries. The charcoal is contained in a hollow plastic cylinder perforated on either end. This is an ideal arrangement for radon uptake, since the perforations act as diffusers and barriers against air currents. Data has shown that radon accumulates as a function of the time of exposure in radon-bearing air. Radon accumulates equilibrium in two days and the radon concentration in the charcoal then remains constant and independent of time thereafter. Of course, in a humid environment, the charcoal will continue to take up moisture, displacing the radon and reducing its concentration in the charcoal. The effect of the moisture can be taken into account to first approximation by noting the final weight of the charcoal, an extra step in the counting and data analysis process. The correction depends on the time variation of the ambient humidity and represents an approximation. This correction diminishes in accuracy the greater the weight percentage of moisture in the charcoal.

After a two to three day exposure time in radon-bearing air, the canister is brought to the laboratory, opened, and poured into a cocktail containing about 10 grams of xylene plus 5 grams of commercial liquid scintillant. The exact amounts are not critical. The radon partitions preferentially with xylene and after a few hours essentially all of the radon has been eluted into the liquid. The liquid is then decanted into a liquid scintillator vial for counting. Since the radon has already been decaying for a number of hours it is in equilibrium with its radioactive isotope decay daughters. As a result, there are three alpha particles and two beta particles emitted for each radon decay. That is, five signals are observed by the photomultiplier for each radon nucleus which decays in the counting vial. The energies of the alpha and beta particles are so great that each particle results in thousands of photons which are detected by the photomultipliers of the LSC. The counting efficiency is therefore close to 100%.

The liquid scintillation counter technique is well established in the biomedical areas of science and several companies make counting equipment which will process hundreds of samples automatically in continuous feed arrangements. These commercial instruments can only utilize relatively small amounts of charcoal; about 5 grams is maximum, 2 grams is about optimum. Thus a two gram canister, made commercially for the food and drug industry, has proved almost ideal for LSC. However, two grams is much smaller that can be utilized by gamma ray counting techniques. Since the amount of radon which can be adsorbed by the charcoal is proportional to the weight of the charcoal, the LSC method, to effectively compete with the gamma ray measuring techniques, must have offsetting advantages. In fact, LSC has improved performance in each of the four areas where the gamma ray detection technique is weak: First, the liquid scintillator detects all the charged particles which result from a radon decay. Thus, it detects 5 signals rather than 2. Second, the liquid scintillation technique has almost 100% efficiency for detection of these high energy charge particles; 95% efficiency is typical. Third, the background counts, typically about 25 counts per minute, are three or more times smaller for LSC than for gamma ray detection, primarily because the liquid scintillant has much smaller volume that the NaI(T1) detector. These three advantages give the LSC technique a 50 to 100-fold advantage over the gamma ray detection technique so that liquid scintillation with a two gram adsorbent is a more effective detector for radon that is a 25 gram adsorbent using gamma ray detection. Finally, the small weight of adsorbent gives the method a further and decisive advantage since it makes practical the engineering of a radon accumulator which is essentially unaffected by humidity.

The reduction of moisture uptake by the adsorbent is a central part of this invention. The invention described herein is more general than its use for radon detection, in that it can be used to reduce or eliminate the moisture uptake from a gas into any adsorbent.

The effect of the moisture uptake on the radon concentration is shown in FIG. 1 based on laboratory measurements. In FIG. 1, the maximum radon which can be adsorbed by two grams of initially dry activated charcoal is plotted as a function of the weight percent of moisture uptake. The former is measured as the net counts per minute of radon radioactivity measured in the LSC; the latter is the weight of water uptake to the weight of dry charcoal. Water uptake by the charcoal montonically decreases the radon count. When the charcoal has adsorbed 25% of its own weight, the radon concentration has decreased by more than a factor of three. these data show that there is a 2.8% decrease in maximum radon adsorption for each weight percent of moisture uptake. A 25% moisture uptake by charcoal can be achieved in a few days of exposure to high relative humidity unless special preventive measures are taken. The detectors now on the market do not take adequate preventive measures. As a consequence, the activated charcoal radon detectors that are now on the market may give values too low by factors as large as two or three if the detectors are placed in a humid environment. The present invention solves this problem in new and novel ways.

Passive diffusion/adsorption devices have been designed containing a radon adsorbent (typically 0.5–5.0 g activated charcoal) placed in various orientations relative to a quantity of desiccant. This desiccant quantity is sufficient to maintain the radon adsorbent in an essentially dry condition for a period of time of between 1 and 7 days of exposure to humid air. The amount of radon adsorbent is sufficiently large to adsorb an amount of airborne radon to permit detection of radon levels as low as 0.1 pCi per liter of air using liquid scintillation counting (LSC). The amount of adsorbent is also sufficiently small so as to be extractable into liquid scintillation solution and countable in commercially available LSC vials (holding a maximum of approximately 25 ml) placed in commercial LSC machines. The desiccant in the device (typically 2–25 g silica gel), eliminates moisture in the charcoal, thereby obviating moisture correction calculations in the counting data. Such calculations inevitably reduce the accuracy of the radon test.

The moisture partition between dry charcoal and silica gel desiccant placed in different locations relative to one another in the device, with the desiccant carrying different percentages by weight of water has been studied. Considering the location of the diffusion entrances in the device for ambient air, studies have shown that desiccants can be positioned in "parallel" with or even behind the charcoal, as well as in "series" with, i.e., in front of the charcoal. That is, a wide variety of geometries of adsorbent and desiccant can maintain the charcoal adsorbent in an essentially dry condition. The various geometries of desiccant positioning are possible because of the unanticipated discovery that a sufficient amount of desiccant, maintained below a certain percentage content of water and positioned near the charcoal, will remove moisture from the charcoal adsorbent more rapidly than moisture can enter the device by diffusion to accumulate in the dry charcoal. The ability of the desiccant to remove water vapor after it has entered the charcoal is surprising, since at room temperature, charcoal is itself such a powerful adsorption agent for diverse gasses.

The ability to maintain charcoal in a dry condition without the limitation of placing the desiccant in front of the charcoal, i.e., between the charcoal and the diffusion entrance for ambient air, is significant for several reasons. First, is the practical one of allowing greater variations in the allowable geometries for desiccant-adsorbent, which can result in significant cost-savings in packaging. Second, the new discovery allows one flexibility to design geometries for special purposes such as determining the source of radon emanation. Third, the new discovery allows a far better control of the "time-constants", i.e., the equilibration time for practical detectors than would be possible with the normal prior-art "series" geometry in which the radon bearing air passes through the desiccant to the adsorbent. Regarding this last point, it has been found that a desiccant, even in coarse granular form, may significantly reduce the diffusion rate of radon into the charcoal if placed in "series" between the entrance and the adsorbent. In such a geometry, the diffusion rates is thus controlled by a variety of interrelated factors. It is desirable to control the radon diffusion rate, and thus the device's equilibration time for radon, by varying only the size of the diffusion entrance to the device. This control is readily achieved if the desiccant is positioned in parallel with or even behind the radon adsorbent. For common desiccants, such as silica gel and Drierite TM (anhydrous $CaSO_4$) the amount of desiccant should be between one and ten times as great as the weight of charcoal. This amount of desiccant is sufficient to maintain charcoal dryness for at least 4 days even at a relative humidity of 80% given, for example, diffusion openings of between 0.10 and 1.0 cm$^2$ per 2.0 g charcoal. For diffusion access and for subsequently maximizing LSC counting efficiency and convenience in sample processing, the charcoal may be packaged in a gas and liquid permeable container (e.g., a canister or bag) which can be placed directly in the LSC solution.

Currently available passive collectors for radon typically consist of between 25 and 50 grams (g) of activated charcoal packaged in a container with or without a diffusion limiting orifice to control the rate of radon uptake. This quantity of charcoal is appropriate for conventional gamma ray measurement of radon levels above 1 picoCurie (pCi) per liter. No current device has the capability of preventing ambient moisture uptake by the dry activated charcoal in conditions of high humidity over a several day period. Consequently, inaccuracies are generated in calculating ambient radon levels because radon adsorption-moisture correction factors are often large. These corrections introduce large uncertainties in the final calculations of radon level.

Much smaller amounts of charcoal may be used to constitute the radon adsorbent in such collectors if liquid scintillation counting (LSC) is utilized to measure the radon level rather than gamma counting. This reduction in scale is possible since one can obtain at least a 50-fold greater sensitivity per gram of charcoal in measuring radon and its radioactive daughter products by LSC rather than by gamma counting.

For example, using LSC detectors, at an ambient radon level of 1 pCi per liter, 55 cpm above a constant background of 25 cpm using a 2 g miniature charcoal detector is typically measured. Yet a conventional state-of-the-art detector containing 25 charcoal designed for gamma ray counting of radon measured 13 cpm for air containing 1 pCi per liter radon above a background of 80 cpm in the 220-390 KeV energy spectral window (Cohen and Nason, 1986). At this radon level, the signal to background ratio of the liquid scintillation detector is more than a factor ten times the ratio obtained with the gamma detector.

The 1 to 5 g quantity of charcoal which has been designed into the radon detectors for LSC counting, permits additional critical design modifications which were hitherto either impractical or impossible. To understand these features it is necessary to consider the principles and mechanisms governing the functioning of the passive adsorption radon detector.

Activated charcoal granules are typically used as the material for adsorbing radioactive radon in passive diffusion collector devices designed to monitor airborne radon levels. The charcoal within such collector devices is intended to accumulate radon over time, from the surrounding air. After a certain period of time, a sufficient volume of air has entered the device to equilibrate the charcoal (via an adsorption-desorption equilibrium) with respect to the airborne radon. The time required to reach this steady state may be defined as the integration time constant (ITC) for the device. The diffusion rate of radon into the device, the weight of charcoal, its surface area as well as the geometry of the device determine the ITC for the device. If, for example a substantial amount of charcoal is located in a device with only a small opening, the ITC may be large. Conversely, a thin bed of charcoal placed in open cheese cloth suspended in radon-containing air would have a small ITC. An ITC of between 2 days and 1 week is often very desirable so that an integrated average radon level is measured despite diurnal and other natural fluctuations in ambient environmental radon concentration.

Passive diffusion charcoal collectors for radon have been in use for many years but their accuracy and sensitivity are compromised by the presence of water vapor in the air being monitored. Adsorption of water diminishes charcoal's capacity for adsorbing radon. Moisture correction curves can be applied to the radon accumulation data (radioactivity typically measured as counts per minute and converted to pCi per liter of air). However, these moisture correction methods suffer the limitation that the water content of the intitially dry charcoal is increasing over the device's exposure period and may also be fluctuating. Thus, the water correction factor tends to be imprecise. It is common to measure a 20-25% increase in charcoal weight due to water vapor accumulation under moderate to high humidity conditions (about 75% relative humidity) over a two or three day period. This water content typically causes greater than a 50% reduction in radon adsorption capacity. Therefore, large uncertainties in the actual radon level are generated as a result of changing water content in charcoal.

There has been one published report on a passive charcoal collector for radon in which the authors attempted to solve the water adsorption problem in charcoal. A porous bag of dry silica gel was placed against the underside of the lid of the collector canister in the path of air entering through a round hole in this lid. The purpose of the silica gel was to dry the incoming air before reaching the charcoal in the bottom of the can. The authors failed in the attempt noting only about a 25% reduction in the amount of water reaching the charcoal, compared to a similar device lacking silica gel. It was noted that even when the radon canister was completely filled with loose desiccant, "the mass gain of the charcoal under high humidity conditions (was) reduced to half of that with the double nylon screen alone . . . " (Cohen and Nason, 1986). Given these unsatisfactory results the ability of silica gel and similar granular drying agents (e.g., Drierite TM -anhydrous $CaSO_4$) to keep charcoal granules completely dry during radon collection over a several day period was studied. Because dry silica gel and some other agents have a stronger affinity for water than does dry charcoal (up to a certain threshold water content in the drying agent), water previously adsorbed by charcoal can be removed by juxtaposition of the drying agent and the moist charcoal within one container. By placing a sufficient amount of the drying agent in a passive diffusion radon collector alongside the charcoal granules within the device, the charcoal may be maintained dry even in the presence of high humidity. The amount of drying agent required to keep the air dry within a diffusion collector depends upon the air diffusion rate, the water content of the moist air entering the collector, and the exposure time to the air. As it has shown, the minimum amount of drying agent required under conditions of high humidity is an amount equal to and preferable twice the amount of charcoal adsorbent. The weight and size of a passive detector are important considerations from a marketing point of view. The conventional passive radon collectors which typically contain 25 g of charcoal would have to have 50 to 75 g of desiccant to maintain dryness. The added weight would add several dollars to the first class mailing costs and would seriously comprise the competitiveness of the product. From a marketing point of view, it is therefore essential to reduce the size of conventional passive radon collectors by reducing the amount of adsorption charcoal by factors of at least ten. This has been done by making use of the advantages of the LSC counting techniques. By appropriate choice of the size of the diffusion orifices into the devices, all incoming moisture was sequestered in air for test periods extending to at least one week using only these modest amounts of drying agents. Since 2 to 4 days is typically sufficient for integrating over diurnal and meteorological fluctuations in radon levels, drying capacity is more than adequate. From another perspective, by reducing the size (i.e., area) of the diffusion orifice, and thus reducing the amount of incoming radon-bearing air, a smaller amount of charcoal is appropriate to effectively equilibrate with the air (one gram of charcoal retains the radon content of approximately four liters of air). This has been compensated, in turn, for the proportionately smaller amount of radioactive radon captured by the smaller amount of charcoal by employing a very sensitive radioactive counting method. The method known as liquid scintillation counting (LSC) is described in the prior art but has not yet been employed in combination with a miniaturized or a humidity-independent radon collector.

Determining the Amount of Drying Agent (e.g., silica gel) Required to Remove Moisture from Radon-bearing Air It has been empirically determined that each gram of dry activated charcoal in a passive diffusion radon collector can retain the radon content from approximately 4 liters of air. Nevertheless much more than 4 liters of air per gram charcoal has been found to enter such collectors in the course of typical radon test periods. The amount of drying agent such as silica gel, required to keep charcoal dry in radon collectors which have been designed is estimated as follows: It has been previously reported that silica gel acting as a drying agent will adsorb water equal to 30–33% of its dry weight. It has been experimentally determined that silica gel placed next to dry charcoal in a closed container retains 100% of the moisture, provided that the amount of water contained in the silica gel is less than or equal to 20% of its original dry weight. Above approximately 25% added water weight, however, the silica gel gives up almost all additional water to dry juxtaposed charcoal. Therefore, it is desirable to include sufficient silica gel in a radon collector so as not to exceed the 20% water figure mentioned above. A number of radon collectors have been designed which have integration time constants of between one and four days and are therefore exposed to ambient atmospheric conditions for at least those lengths of time. It has been determined that at 23° C. under conditions of maximum relative humidity (approaching 100%) the originally dry charcoal in these collectors may accumulate up to 25% added weight of water in a 24 hour period if silica gel is absent. The weight of dry silica gel required to adsorb this water and still remain below 20% added water weight is approximately 1.25 times the weight of the charcoal in the collector. For four days of radon collection it may therefore be necessary to have 4×1.25 or 5 times as much dry silica gel as dry charcoal in a passive radon collector. In miniaturized passive radon collectors containing typically 1 to 5 g dry charcoal the amount of silica gel therefore ranges from 5 to 25 g but maybe as little as 2 g if either the humidity is lower or the exposure time is shorter than the maximum figures cited above.

In prior art devices designed to measure radon levels by charcoal adsorption, moisture accumulation has been problematic. As described previously (A. S George, Health Physics 46, 867–872, 1984), correction curves may be applied to the radon levels measured, but these corrections introduce considerable uncertainties in the final calculated levels. Cohen and Nason (Health Physics 50, 457–463, 1986) attempted to block moisture entry into a 25 g passive charcoal collector using a 3 g bag of "sorbit" silica gel mounted under a ¾ inch diameter opening to the air. The scale of their device, both in terms of weight of charcoal and diffusion orifice is approximately 10-fold larger than devices made in accordance with this invention and would require approximately 125 g silica gel to maintain charcoal dryness for approximately a 4 day exposure at moderate to high humidity. The Cohen and Nason device even when entirely filled with silica gel positioned between the diffusion opening and the charcoal layer still accumulated an amount of water in the charcoal equal to half the amount obtained without any drying agent (above reference, pp. 461–462).

Location of the Drying Agent

Both in the Cohen and Nason (1986) radon collector and in an adsorbent measuring device for chemical substances described in the patent literature (Locker, U.S. Pat. No. 4,327,575), drying agents and other pre-adsorbents have been inserted in the path of incoming air to eliminate an undesirable or interfering gas or other substance prior to the air entering the primary adsorbent (e.g., charcoal).

It was predicted that significant benefits could be obtained if the drying agent were placed alongside of, or behind, the charcoal rather than in the path of incoming air diffusing toward the charcoal (the primary adsorbent). That is, if a desiccant removed the moisture from incoming air at the same time or even after the air came in contact with the charcoal, the radon diffusion rate of the passive collector could be adjusted and optimized independently of the desiccant present. It was discovered that water can indeed be removed by desiccant positioned as described above. It was determined that charcoal can even be kept dry by desiccant placed beyond the charcoal relative to the diffusion opening (after the air has contacted the charcoal). In the case of silica gel, the amount of desiccant should be sufficient so that its moisture content does not exceed approximately 20% of its dry weight.

Radon-containing charcoal has been counted by LSC, with improved sensitivity, reproducibility and convenience by introducing additional design features into the radon collectors. These features include packaging the charcoal in a gas and liquid permeable translucent or transparent container which can be directly immersed in LSC organic counting solvent. These containers liberate radon into the counting solvent without harmfully reacting with the solvent. Examples of appropriate materials for such charcoal containers include the polyolefins (including holes or pores for permeability) as well as paper, fiber and membrane materials which become clear or translucent in LSC solvent. The design features also include utilizing a substantially dust-free washed granular charcoal to maximize the flourescence light output from the LSC vials. It is impossible however, to completely eliminate charcoal dust from granular charcoal due to a certain level of abrasion between loose particles. It was discovered that by maintaining the charcoal essentially dry during radon exposure (using the desiccant design features), whatever charcoal dust is still present in the LSC solvent, settles to the bottom of the counting vial together with the coarse granules. Conversely however, if the charcoal is not maintained essentially dry, the same charcoal dust adheres to the walls of the LSC counting vial, reducing light output and thereby decreasing the reproducibility and sensitivity of the LSC test. Therefore, careful desiccant design not only results in increased radon capacity for a given amount of activated charcoal but also improves the subsequent accuracy of the test using LSC counting.

Type of Drying Agent

Several granular desiccant materials have been successfully used to exclude moisture from radon adsorbent materials. In the presence of charcoal adsorbent, both granular silica gel desiccant (approximately 1 to 2 mm grain diameter) and anhydrous $CaSO_4$ or Drierite ™ (approximately 2 to 4 mm grain size) have proven effective at removing and/or excluding moisture. These desiccants have been effective both in free granular form as well as in porous packaged form, juxtaposed to charcoal placed within a porous container. The desiccant material is preferably chosen from the group as moisture adsorbents which do not deliquesce, i.e., become wet in the presence of moisture. Such deliquescence can result in contamination of the charcoal by partially dissolved desiccant. This contamination could, in turn, cause fluorescence quenching and thus data abnormalities during LSC sample analysis.

Air Convection Barrier

It has previously been shown that a double layer of fine nylon mesh placed over the diffusion opening of a passive radon detector device serves to reduce undesirable entry of air into such a device via convection (Cohen and Nason, 1986). It was demonstrated that a less expensive and equally effective paper barrier can replace the nylon mesh. For example, it was shown that there is no significant difference in radon diffusion rate into such devices, comparing Whatman No. 1 filter paper and nylon mesh placed over the opening. It was additionally found that under conditions of high relative humidity, a hydrophobic filter paper barrier (displaying little to no moisture affinity) is superior to ordinary filter paper (hydrophilic) in minimizing moisture uptake by the device. Thus high porosity siliconized phase separation filter paper (typically used in separating aqueous and nonaqueous liquid phases) is ideal. Such filter paper is commonly available from Whatman (1PS paper) and Schleicher and Schuell (595hy paper).

The resulting passive diffusion detector which embodies the above considerations may take a variety of forms. Each form however, need only contain a small amount of charcoal (2 g is appropriate for LSC analysis of charcoal) and a relatively small amount of desiccant (5 to 10 g of silica gel will maintain the charcoal moisture-free in a high humidity environment over many days). The resulting detector is less than one quarter the size and weight of competitive passive detectors.

SPECIFIC CONSTRUCTIONS OF THE PASSIVE RADON DETECTORS

FIGS. 2A through 4B, show a variety of different functional geometries for positioning radon adsorbent and moisture desiccant in passive diffusion radon detectors. In the drawings the open arrows represents air carrying radon and moisture into the detectors. The closed arrows represent the direction of moisture movement within the detectors. In the devices 10 of FIGS. 2A, 2B and 2C desiccant 12 is placed in "series" relative to the direction of entry of radon and moisture into the detectors upstream from the radon adsorbent 14 in containers 16. In devices 3A, 3B and 3C desiccant 12 is placed in "parallel", i.e., along side the radon adsorbent 14, relative to the direction of entry of gasses into the detectors. In devices 4A and 4B desiccant 12 is placed "downstream" from, i.e., behind, the radon adsorbent 14 relative to the direction of entry of gasses into the detectors. For convenience in analyzing radon in the charcoal adsorbent 14 without the interference of desiccant 12 (using the LSC method) the desiccant 12 is packaged separately and is separated from the adsorbent 14 by either rigid or flexible radon-permeable containing means. A porous membrane, mesh, filter paper 18 or equivalent radon-permeable air convection barrier is positioned at the air entry orifices of the detectors. The outer container 16 of the detectors is radon and moisture-impermeable. Mesh 20 may separate the desiccant 12 from the adsorbent 14 as in FIGS. 1A and 1B or the desiccant and adsorbent may be placed in permeable bags 22.

Figure 2A:
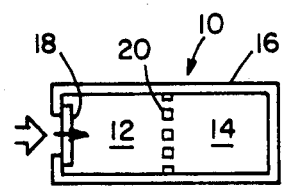
FIGS. 2A through 4B are schematic representations of different functional geometries for positioning radon adsorbent and moisture desiccant in passive diffusion radon detectors.
Figure 2B:
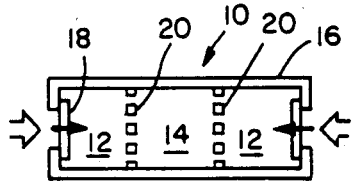
Figure 2C:
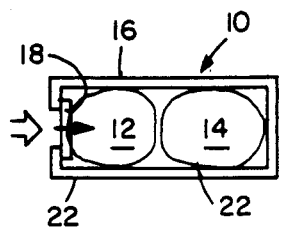
Figure 3A:
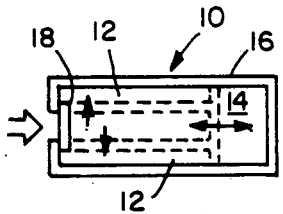
Figure 3B:
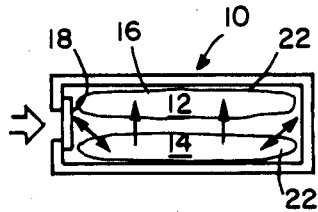
Figure 3C:
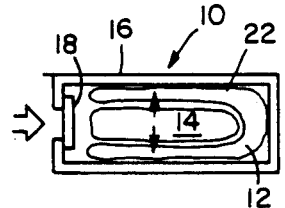
Figure 4A:
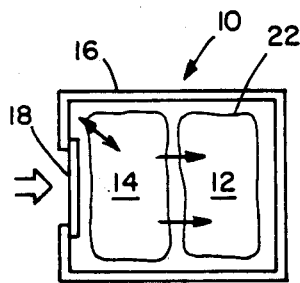
Figure 4B:
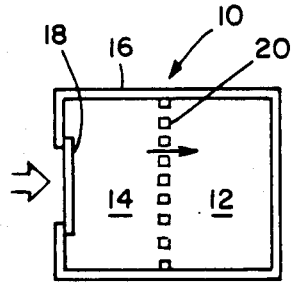
Figure 5:
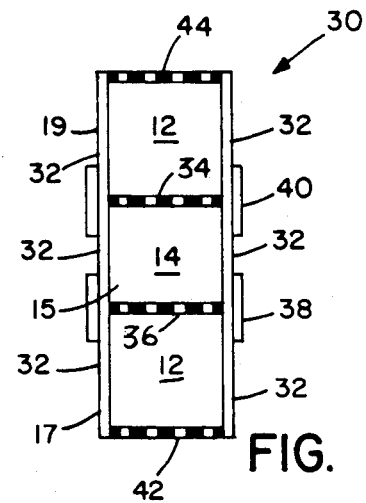
FIG. 5 shows a radon detection device embodying the invention.

One embodiment of a passive diffusion radon detector with desiccant 12 on two sides or a radon adsorbent canister is shown in FIG. 5. This triple canister device which is similar to that shown in FIGS. 2B is a plastic cylinder 30 containing approximately 2 g activated charcoal 14 in a central container 15 with gas impermeable side walls 32 yet which is permeable at both ends 34 and 36 to allow entry of radon. Approximately 2 to 3 g desiccant 12 such as anhydrous silica gel is packaged in each of two outer desiccant containers 17 and 19 which are similar to container 15 and connected to central 15 by gas-impermeable ring adapters 34 and 36 forming radon and moisture-impermeable seals between the cylindrical elements of the device 30. The porosity of the permeable ends 42 and 44 in the desiccant cylinders may be varied to control the rate of entry of airborne radon (and moisture) into the device. Nylon meshes and polyethylene grids having different percentages of open space have been used to vary these rates which in turn influence the integration time constants of the devices.

Figure 6:
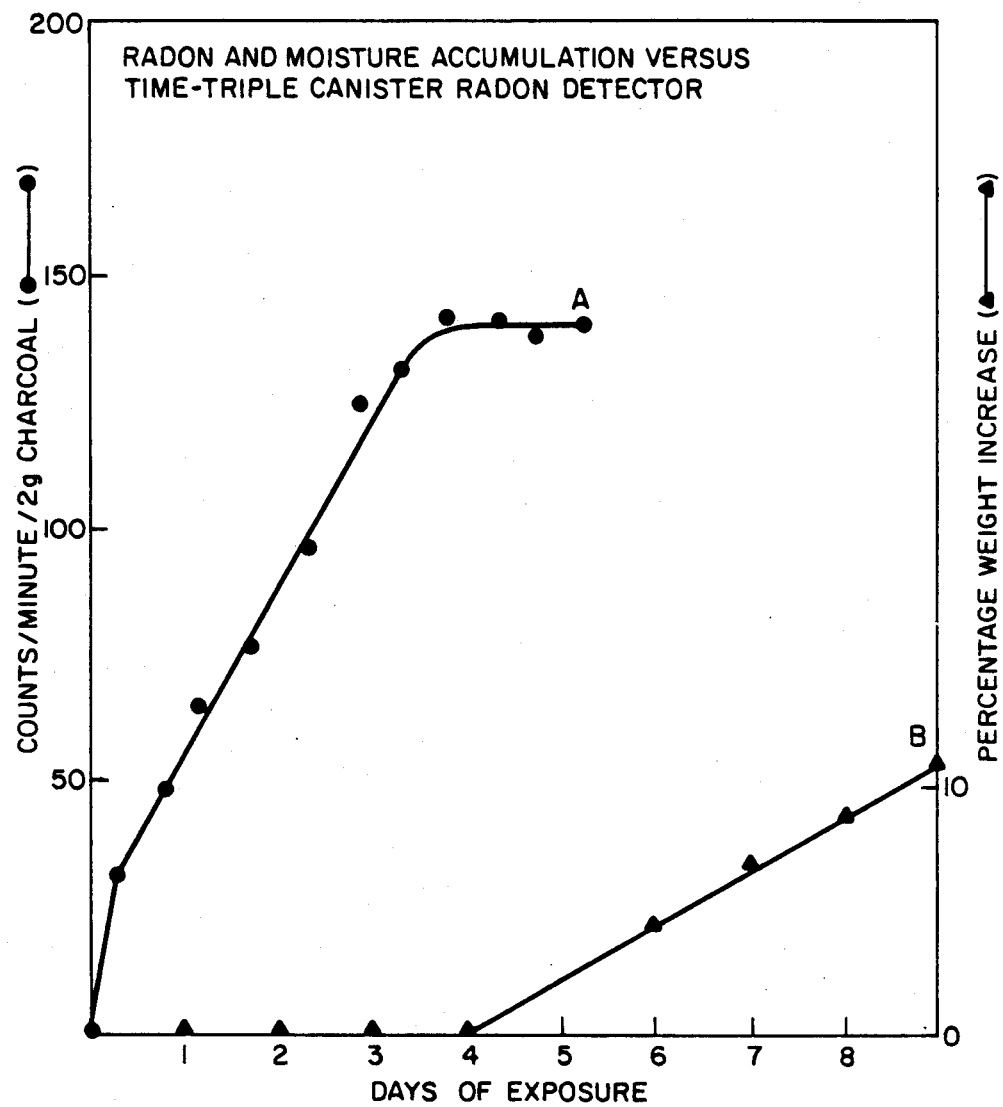
FIG. 6 is a graph showing radon and moisture accumulation in a triple canister radon detector plotted against days of exposure to ambient air.

A number of identical devices 30 shown in FIG. 5 carrying 2.0 g granular charcoal in a central canister and 2.5 g granular silica gel in each of the outside canisters were exposed to airborne radon at a concentration of 2.6 pCi/liter. The canisters 30 were positioned vertically during exposure to radon with both ends 42 and 44 having open access to the ambient atmosphere. Following exposure to radon, the charcoal from each canister was counted by LSC and the data plotted as seen in FIG. 6 as a function of exposure time (A). A plateau in the level of adsorbed radon was reached in 3.5–4.0 days. Subsequently, other identical devices were exposed to a high level of humidity (80% relative humidity, 23° C.). The canisters were positioned vertically as described above. The percentage weight gain by the charcoal due to moisture penetration of desiccant (termed moisture "break-through") was monitored as a function of time. Break-through did not occur until after 4 days of exposure, proving that radon equilibration (requiring 3-4 days) takes place before any substantial moisture uptake by the charcoal can occur (at relative humidities up to 80%). Moisture break-through commenced when the weight percentage of water gained by the dry silica gel exceeded 20-25%.

Figure 7:
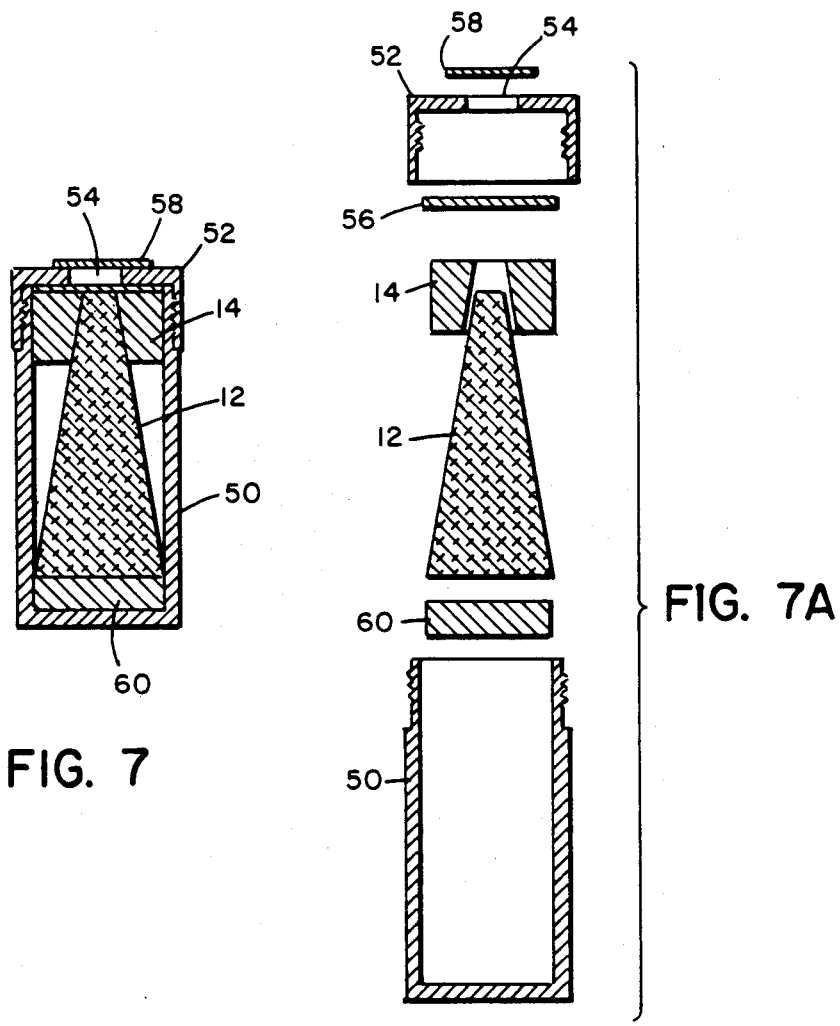

A preferred embodiment of a passive diffusion radon detector is shown in FIGS. 7 and 7A. Desiccant 12 is placed in the same chamber as the radon adsorbent 14. This device which is similar in principle to those shown in FIGS. 3B and 3C maintains approximately 2 g activated charcoal 14 in an essentially dry state without requiring the ambient atmosphere to first pass through desiccant 12. In fact the incoming air contacts the charcoal and desiccant simultaneously, i.e., in "parallel". The desiccant is effective in removing moisture from the charcoal [less than 0.5%-1.0% weight gain due to moisture retained by the charcoal over a 4 day period at 60-70% relative humidity]. The 2.0 g charcoal 14 and approximately 10 g silica gel desiccant 12 are packaged in commercially available flexible fiber bags. After wrapping the smaller charcoal bag 14 around the silica gel bag 12, the combination is placed in a polyethylene air-tight vial 50 having screw-cap 52 (Poly Q vial, Beckman, Inc.). However the screw-cap 52 has been modified by punching a 1 cm diameter hole 54 in the center of the cap and placing a 21 mm diameter filter paper disc 56 (hydrophobic paper #595 hy, Schleicher and Schuell, Inc.) under the cap 52. This filter disc serves as a gas permeable anti-air convection barrier. A moisture and radon-impermeable tape tab 58 is placed over the hole in the cap to seal the device and prevent the ambient atmosphere from entering the device before exposure to radon is desired.

A short length of ⅜" diameter gum-rubber tubing or a foam rubber disc 60 is placed at the bottom on the vial beneath the desiccant to "spring-load" the contents of the vial. This feature pushes the vial's contents upward against the filter paper disc 56 and screw-cap 52 thereby seating the filter-paper disc and assuring reproducible diffusion geometry for the charcoal.

Figure 9:
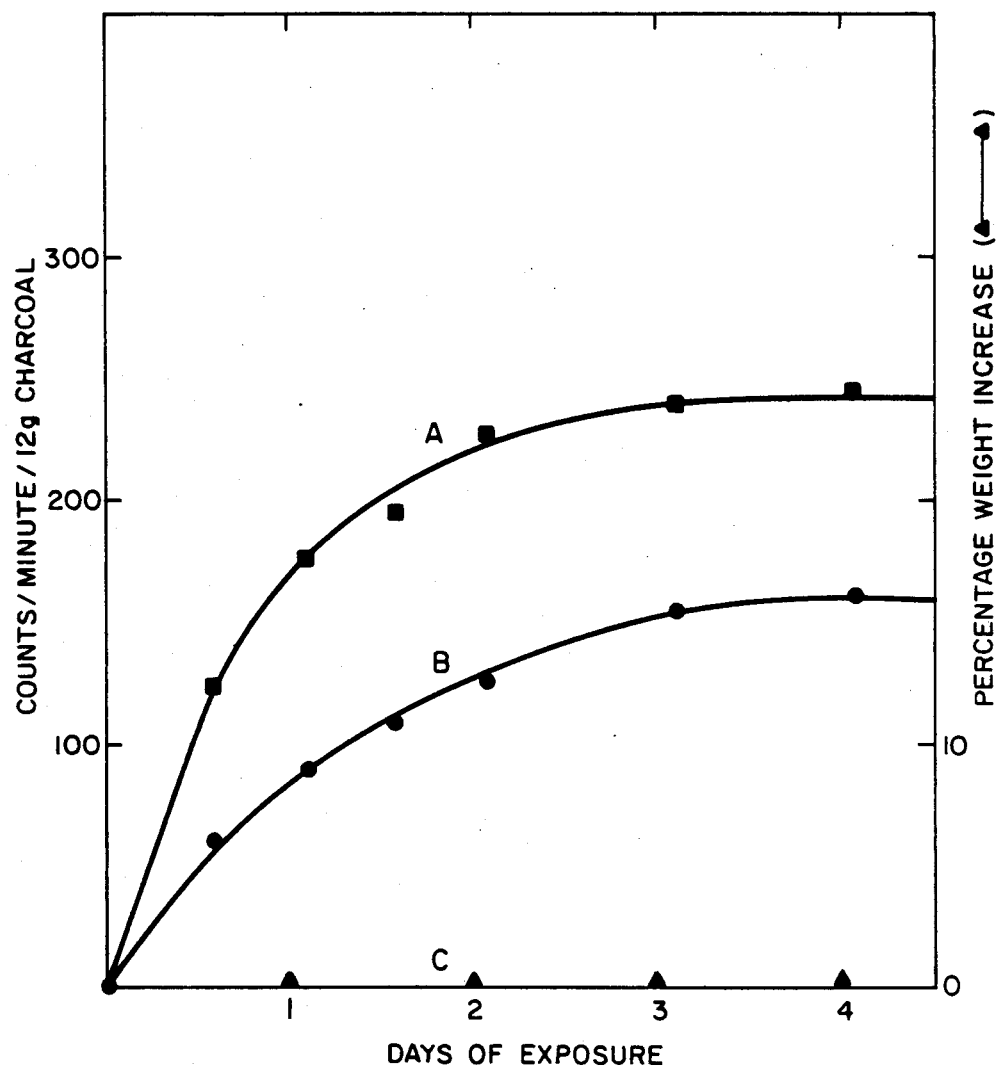
FIG. 9 is a graph showing equilibrium radon (9A and 9B) and moisture (9C) uptake curves for the charcoal in passive diffusion device described in FIGS. 8 and 8A.

Another embodiment of a passive diffusion device for detecting radon is shown in FIGS. 8 and 8A. It contains juxtaposed gas-permeable bags of adsorbent and desiccant. This device, similar to that diagrammed in FIG. 3B but having diffusion openings at both ends of the container, has been tested satisfactorily. The outer container vial 50 is the same as that used in FIG. 7. Centered round holes 54 placed at both ends of the container, i.e., one in the container 50 and one in the cap 52, allow for entry of radon which passes through air convection barriers 56 as described with respect to FIG. 7. Air and radon-permeable polyurethane cushions 60 assure that these barriers 56 are well seated, both inside the cap 52 and at the bottom of the container vial 50. Two porous fiber bags, 62 and 64, containing approximately 2.0 g granular activated charcoal 14 and the other containing between 2 and 5 g silica gel 12 have been juxtaposed within the container between the porous cushions 6 as seen in FIG. 8. FIG. 9 discloses radon equilibration and moisture uptake curves for passive diffusion device described in FIG. 8. Devices described in FIG. 8 containing 2.0 g granular activated charcoal 12 and 3.0 g anhydrous silica gel 14 were exposed to airborne radon for increasing lengths of time. These devices had either 9.0 mm or 5.0 mm diameter holes. The curves of each being designated A and B respectively in FIG. 9. A slower equilibration rate (longer integration time constant) and significantly lower radon plateau level is apparent for device with the smaller hole (B) compared to the device with the larger hole (A). The charcoal in both devices showed no measurable moisture uptake in the course of four day exposures to the ambient atmosphere at a relative humidity of 60-70% at 23° C. as seen in curve (C).

As pointed out above, the radon diffusion rate into the charcoal of the collector can be adjusted independently of the desiccant present if the location of the desiccant between the diffusion opening and the adsorbent (described for a detector in the prior art) were changed. In the detector referred to, the desiccant (described by Cohen and Nason in 1986), was present in an amount insufficient to maintain the charcoal in a dry condition during the exposure period as evidenced in the above cited reference and as demonstrated in the present application.

Most importantly, the change in location of the desiccant from a position between the diffusion opening and the charcoal in the collector, to a position alongside the charcoal has allowed the design and construction of humidity-independent passive diffusion radon detectors requiring significantly shorter exposure equilibration periods. For example, it has been found that a four day equilibrating radon detector, see FIGS. 5 and 6, can be supplemented by a detector equilibrating in only two days by moving the location of the desiccant and adjusting the size of the diffusion aperature(s) for a given amount of charcoal. The detector shown in FIGS. 8 and 8A has two day equilibration capability. At the same time the charcoal can be maintained in an essentially dry condition minimizing the need for radon corrections based on the amount of moisture uptake. The advantages of achieving radon equilibration in two days rather than four include obtaining radon testing results sooner, reducing the amount of desiccant required to keep the same amount of charcoal dry (since the amount of moisture uptake by the desiccant is approximately linear with exposure time), and obtaining somewhat greater radon sensitivity [because the steady state level of radon is greater in a rapidly equilibrating device due to the short half-life of radon (3.8 days)].

Figure 10:
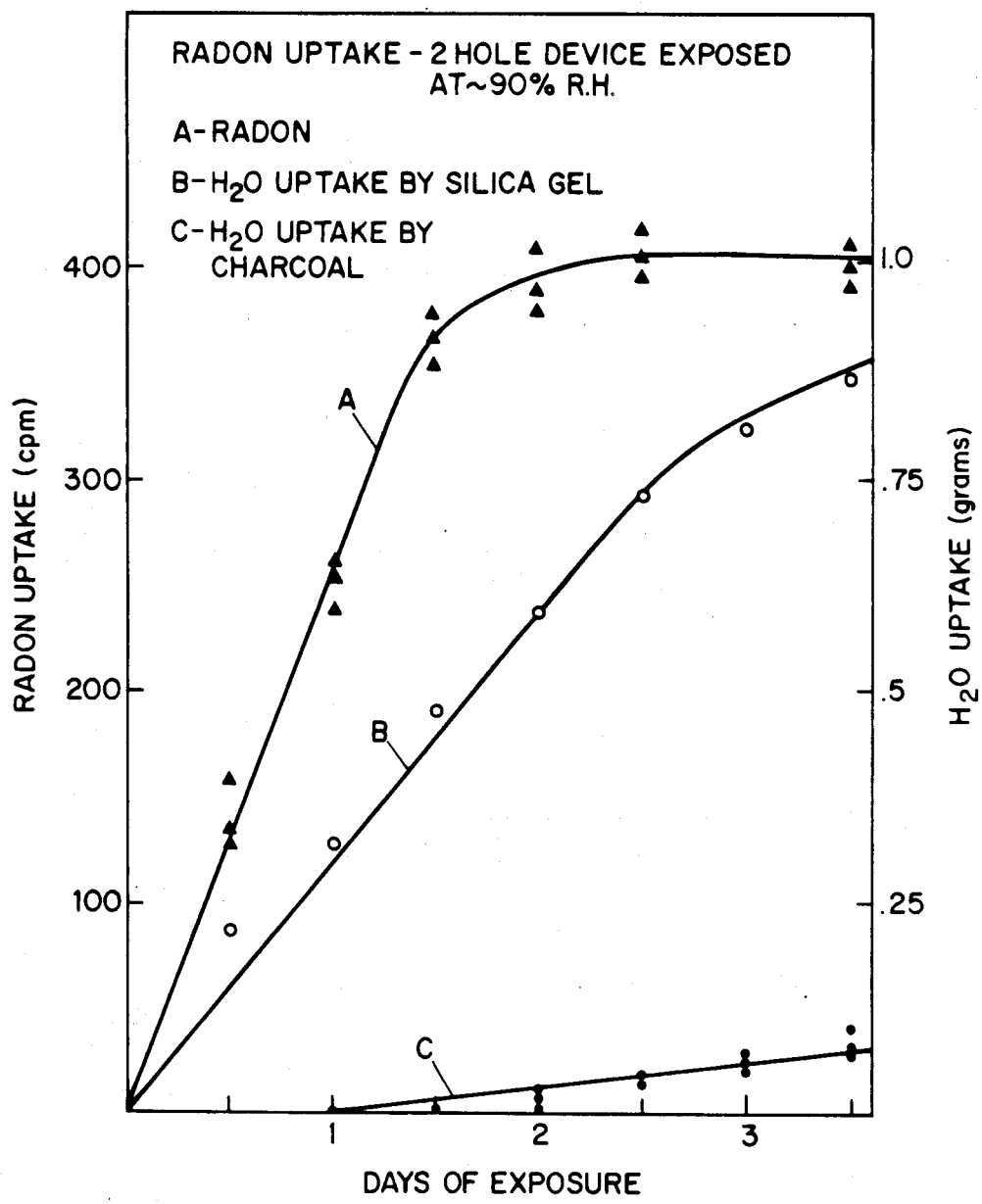
FIG. 10 is a graph showing (a) equilibrium radon uptake by the charcoal, (b) moisture uptake by the silica gel, and (c) the moisture charcoal curves for the passive diffusion device of FIG. 8 in which the water uptake measured is in grams.

Devices based on the design shown in FIG. 8 and containing a 2 g bag of charcoal, 5 g bag of silica gel and two round diffusion openings measuring approximately 11 mm in diameter have been constructed and tested, FIG. 10. It can be seen from the kinetics of radon uptake that the device equilibrated in two days. Under the challenging high humidity conditions of this test (approximately 90% relative humidity, 20° C.), after two days, approximately 600 mg $H_2O$ (12% by weight) had been adsorbed by the 5 g bag of silica gel and only 30 mg water (1.5% by weight) by the 2 g bag of charcoal, FIG. 10.

FIG. 10 discloses the relatively rapid radon equilibration possible in an essentially humidity independent passive diffusion device. More specifically, FIG. 10 discloses radon equilibration and moisture uptake curves for one version of the passive diffusion device described in FIG. 8. Devices described in FIG. 8 containing 2.0 g granular activated charcoal 12 and 5.0 g anhydrous silica gel 14 were exposed to airborne radon in the presence of high relative humidity (R.H.=90%) for increasing lengths of time. These devices had 11.0 mm diameter diffusion holes, 54 at each end. The radon equilibration curve and percentage moisture uptake by the silica gel and charcoal are designated A, B and C respectively. After just two days exposure, radon equilibration was observed. By this time 630 mg water had entered the device, 30 mg of which was located in the charcoal and the remaining residing in the silica gel. A similar diffusion device constructed without the silica gel drying agent showed 520 mg water uptake by the 2 g bag of charcoal. This amount of water represents 25% of the original charcoal weight compared to 1.5% (30 mg) above and would necessitate correcting the radon reading by 3.7-fold rather than by only 1.04-fold when desiccant is present.

Active radon detectors on the other hand, have an active mechanical or electronic component at the test site and are designed to monitor the radon concentration in air at a particular point in time. Active sampling devices may be particularly useful for rapid sampling of radon at targeted locations, e.g., suspected sources of radon such as cracks in foundations, crawl spaces, etc. Rapid so-called "grab" sampling of radon has been carried out using devices which physically capture the radioactivity in a predetermined volume of air. Subsequently, the radon concentration and/or the concentration of radioactive iostope decay products of radon are monitored therein. For example gas scintillation counting may be used to directly measure the radioactivity in a volume of air. Other devices may selectively capture the radioactivity from the non-gaseous radio-isotope decay products of radon. These radioactive "daughters" may be trapped and counted on membrane filters (calibrated volumes of air having been pumped through these filters). Still other active devices at test sites may electronically measure radon and/or radon daughter isotope radioactive decay events in real time using a variety of detector devices.

This aspect of the invention concerns an apparatus and a method which are particularly effective, i.e., rapid, sensitive, accurate and inexpensive for "grab-sampling" of radon gas. The concept is based upon the well known ability of certain granular adsorbents to retain radon. Previously, however, these adsorbents, and in particular activated charcoal, have been used only in passive detectors to slowly accumulate radon via gas diffusion. The active method termed "rapid flow equilibrium adsorption of radon" (abbreviated RFE) depends upon the active passage of air through a bed of adsorbent. This method stands in contrast to the other "active" methods which all involve capturing and counting the radioactivity in predetermined volumes of air. Using the RFE method, a certain quantity of adsorbent such as granular charcoal is placed in a continuous stream of ambient air until it is fully radon-equilibrated, i.e., radon adsorption has reached a steady state. As in passive diffusion-adsorption devices, the natural adsorption-deadsorption partition function existing between free radon in air and adsorbed radon in charcoal determines the "equivalent volume" of air whose radon is effectively removed, i.e., adsorbed by a given mass of dry charcoal. However, in contrast to the passive diffusion method, the RFE method of collecting radon can be carried out and completed in minutes rather than in a period of days. This surprisingly short collection time makes the present invention a useful and commercially significant method for monitoring radon. The short collection time is possible because under conditions of rapid air flow, the equilibration rate for the radon adsorbent (in this case, granular activated charcoal having an approximate 1–2 mm particle size) is very fast. This speed is remarkable given the general usage of granular charcoal in the passive sampling of radon, typically over a period of days. The result is also surprising because it has been generally recognized that when rapid chemical adsorption equilibration is demanded, finely divided rather than granular activated charcoal should be used.

It has been determined that for the active sampling devices of the present invention, a certain minimum time is required for radon equilibration to occur during the passage of ambient air through the bed of adsorbent. This time has been found to be inversely related to the rate of air flow through the device. However, at a moderately high rate of air flow, a limit to the rate of radon adsorption has been observed, above which no further rate increase has been observed. It is believed that at this rate of air flow, radon equilibration is being rate-limited by radon diffusion within the adsorbent granules themselves. This hypothesis is consistent with the knowledge that adsorbents having high porosity and small particle size, such as finely divided activated charcoal, e.g., Norite TM, tend to equilibrate most rapidly.

For the devices of this invention, the radon concentration in the air being sampled (e.g., in picoCuries of radon per liter of air) has been determined by comparing the radioactivity levels in identical collectors which have sampled air containing a known concentration of radon (radioactive count rate being directly proportional to radon concentration).

As in passive diffusion equilibrium adsorption, it has been shown that the presence of moisture in charcoal reduces radon "holding" capacity. A correction curve, later to be described, is used to calculate true radon levels in air when airborne moisture has contributed a significant measurable weight percentage of water to a dry charcoal adsorption bed.

A device suitable for Rapid flow equilibration radon monitoring consists of (1) a bed of adsorbent such as charcoal packaged in a container allowing a steady flow of air to pass through the bed. The air may be propelled under positive or negative pressure. (2) an optional desiccant attachment placed in series with, and "upstream" of the radon adsorbent to allow removal of moisture. (3) a pump to propel the ambient air at a substantially constant rate through the adsorbent. This pump may be powered by an AC or DC electric motor, or even manually.

METHOD OF "GRAB" SAMPLING

An adsorption device for rapid sampling, i.e., "grab" sampling of radon in air is employed. The device consists of a radon adsorbent placed in a container having a geometry which allows forced air to flow continuously through the adsorbent, a pump to propel this air through the adsorbent, and an optional desiccant means which is placed in series with an "upstream" (with respect to the air flow) of the adsorbent. As ambient air is propelled through the device, moisture may be removed from the air by a desiccant such as granular silica get or Drierite TM (anhydrous CaSO$_4$) prior to passage through the radon adsorbent. The desiccant may be conveniently packaged in a canister placed in "series," upstream (relative to air flow) of the adsorbent. This geometry assures that ambient air passes through the desiccant before passing through the radon adsorbent. For a given quantity of radon adsorbent having a certain granular size and porosity, the time required for achieving a plateau in the level of adsorbed radon, must be empirically determined. Initially this time is determined using an excessive and rapid rate of air flow. Subsequently, the rate of air flow through the adsorption device may be empirically reduced until the rate of radon uptake just begins to diminish. This empirically determined "saturating" rate of air flow, while still allowing a maximum rate of radon equilibration, minimizes the quantity of moisture which contacts the adsorbent. For optimum radon sensitivity this moisture should be continuously removed by a desiccant (described below). The parameters of air flow rate and time described above may be empirically determined by exposing a series of identical radon "grab-sampling" devices to a constant ambient source of radon. The radon equilibration exposure time is established first for an excess rate of air flow.

Subsequently, the rate of air flow is appropriately reduced to reduce exposure of the desiccant and the radon adsorbent to moisture. The amounts of radon in each sampling device are measured by standard radioactive counting methods established and described in the prior art. The maximum amount of desiccant required to remove moisture from a given volume of air can be established by standard methods as follows: The total air volume (flow rate × time) required for equilibrating the radon adsorbent is first empirically determined as described above. Then, based on the relative humidity of the air, the amount of water to be removed in this volume of air can be calculated. For example, at 70° F. it is known that 1 cubic meter (1,000 liters) of air at 100% relative humidity holds 18.45g $H_2O$. Therefore, if 37.5 liters of air at 100% relative humidity is pumped through a grab-sampler device in 15 minutes to equilibrate 2.0 g of charcoal adsorbent with radon, 0.69 g $H_2O$ must be removed.

It has been independently determined that anhydrous silica gel can hold at least 20% by weight water before any significant percentage of this water is released to an adjacent charcoal radon adsorbent. The amount of required silica gel desiccant would therefore be 0.69 g÷0.20 or 3.45 g. Therefore, a 5.0 g anhydrous granular silica gel bed positioned upstream from a 2.0 g bed of charcoal adsorbent is found to be ample for removing this amount of water.

Figure 12:
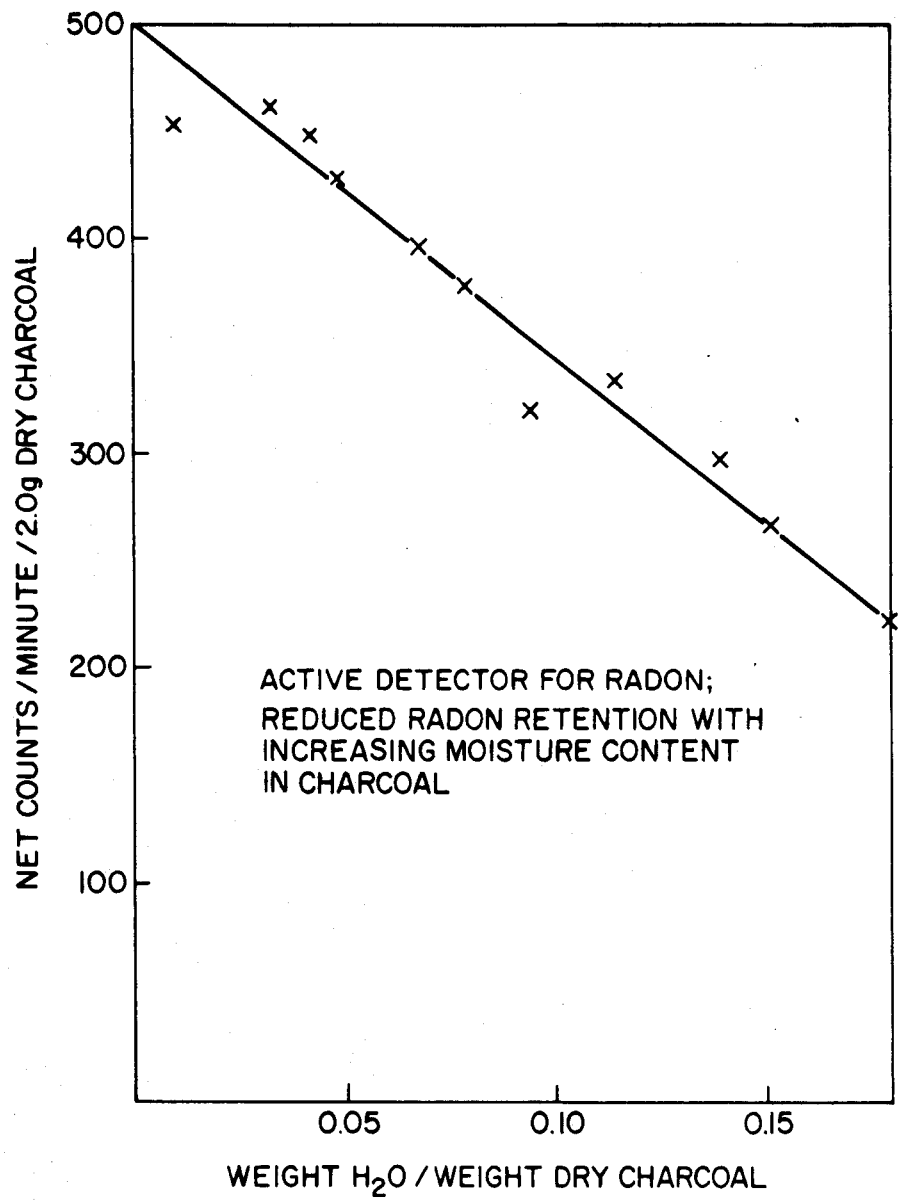
FIG. 12 is a graph similar to that of FIG. 1, in which the equilibrium level of adsorbed radon is progressively reduced by increasing moisture content in the charcoal caused by forced passage of moist radon-bearing air through the charcoal.

Even if the optional desiccant component of the RFE grab-sampler device is not utilized or becomes water saturated and ineffective at removing moisture from the air stream, a correction may be applied to the data based on the experimental testing results, see FIG. 12. From these results it has been determined that a correction factor of approximately 3.0% should be applied to the counting data for each percent by weight of water retained by the dry charcoal during radon adsorption. Thus, if 1.0 g dry charcoal picks up 0.05 g $H_2O$ (5%) by the end of the radon exposure and the LSC radioactivity measurement, for example, yields 100 cpm then the moisture-corrected value would be $100÷(1-0.030×5)=118$ cpm.

Figure 11:
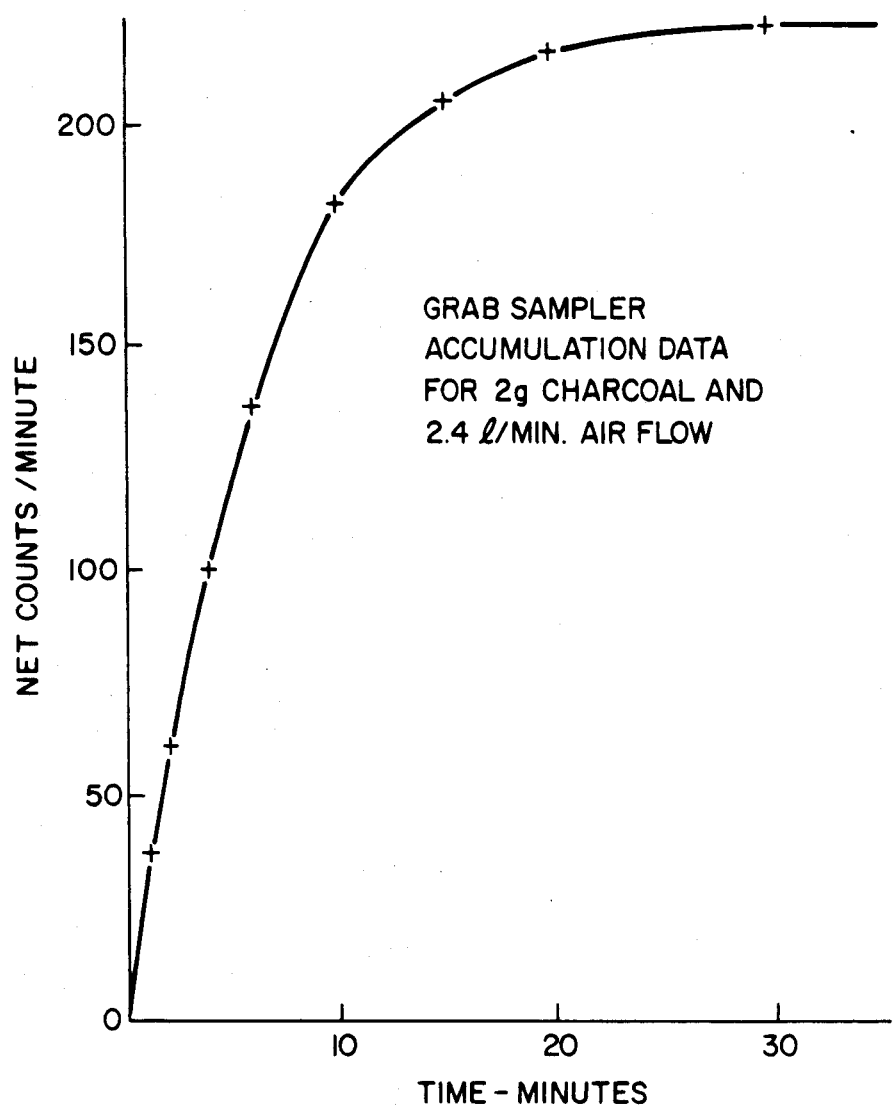
FIG. 11 is a graph showing rapid equilibrium radon uptake by charcoal in the active radon detector shown in FIG. 13.

It has been found that the range of air flow rates appropriate for equilibrating 2 g charcoal adsorbent in the above grab-sampling devices is approximately 0.5 to 5 liters per minute. Equilibration is achieved in less than a one hour period with these flow rates provided that the average diameter of the activated charcoal granules measures between 0.5 and 5 mm. A 1-2 mm diameter charcoal granule size is most preferred. In one embodiment of the charcoal canister, two grams of substantially dust free activated charcoal granules are conveniently packaged within a hollow plastic cylinder perforated at either end. The cylinder, measuring approximately 2 cm in diameter×2.5 cm long and containing small grid openings (0.1-0.3 mm) permits free passage of forced air through the bed of charcoal. One preferred rate of air flow is 1.0 to 2.5 liters per minute with a duration of air flow of 15-30 minutes. These flow conditions equilibrate 2.0 g of activated charcoal having granule diameter sizes of approximately 1.0-2.0 mm. The equilibration curve in FIG. 11 shows that for the above cited conditions, within 15 minutes, approximately 90% of the final radon equilibration level is reached. By 20 minutes approximately 97% saturation is achieved. Smaller or larger quantities of activated charcoal may be packaged in similar flow-through canisters in other embodiments of the present invention.

For example, between 0.5 g and 50 g activated charcoal can be used to grap-sample radon using air flow rates ranging from 0.025 liters per minute to 75 liters per minute. The amount of charcoal used in a grab-sample device is chosen to meet the accuracy and sensitivity requirements of the radon test. Since these parameters are affected by the radioactivity counting method chosen to detect radon and/or its radioactive daughter products, the counting method must be considered in choosing an appropriate amount of charcoal. For example, it has been found that 0.5-5.0 g activated charcoal (with 2.0 g charcoal most preferred) is a convenient and appropriate amount of radon adsorbent for monitoring radon using the RFE devices of the present invention when the subsequent measurement of radon employs liquid scintillation counting (LSC). Thus 0.5-5.0 g of radon-exposed charcoal is placed in commercial liquid scintillation vials (holding 15-25 ml) and mixed with 5-15 ml of conventional LSC solvent, e.g., Econofluor (DuPont) mixed with Xylene in a proportion of 1:2.

After at least 3 hour incubation at room temperature (to allow chemical elution of radon into the xylene and also radon-daughter isotope equilibration to occur within the solution) the vial is counted in a commercial LSC machine such as those manufactured by the Beckman Instruments Corp. The number of counts per minute (cpm) is corrected for half-life decay losses between the time of collecting the sample and the time of radioactivity counting, according to standard methods (half-life or radon=3.8 days). The number of cpm measured in the charcoal is converted to picoCuries of radon per liter of air by calibrating the RFE device with air carrying radon at a known concentration (using identical grab-sampling conditions). In one RFE device containing 2.0 g charcoal approximately 78 cpm are detected per picoCurie of radon per liter of air (setting the LSC machine to count and integrate radon decay events over its entire energy spectrum).

Using the LSC method, three alpha particles and two beta particles are emitted for each radon decay are detected. That is, five signals are observed by the photomultiplier for each radon nucleus which decays in the counting vial. The energies of the alpha and beta particles are so great that each particle results in thousands of photons which are detected by the photomultipliers of the LSC. The counting efficiency is therefore close to 100%.

The LSC technique is well established in the biomedical areas of science and several companies make counting equipment which will process hundreds of samples automatically in continuous feed arrangements. These commercial instruments can only utilize relatively small amounts of charcoal; about 5 grams is maximum, 2 grams is about optimum. Thus a two gram canister, made commercially for the food and drug industry, has proved almost ideal for LSC. However, two grams is much smaller than can be utilized by gramma ray counting techniques. Since the amount of radon which can be adsorbed by the charcoal is proportional to the weight of the charcoal, the LSC method, to effectively compete with the gamma ray measuring techniques, must have offsetting advantages. In fact, LSC has improved performance in each of the four areas where the gamma ray detection technique is weak: First, the liquid scintillator detects all the charged particles which results from a radon decay. Thus, it detects 5 signals rather than 2. Second, the liquid scintillation technique has almost 100% efficiency for detection of these high energy charged particles; 95% efficiency is typical. Third, the background counts, typically about 25 counts per minute, are three or more times lower for LSC than for gamma ray detection, primarily because the liquid scintillant has much smaller volume than the NaI(Tl). These three advantages gives the LSC technique a 50 to 100 fold advantage over the gamma ray detection technique so that liquid scintillation with a two gram adsorbent is a more effective detector for radon than is a 25 gram adsorbent using gamma ray detection. Finally, the small weight of adsorbent gives the method a further and decisive advantage since it makes practical the engineering of an RFE radon grab-sampler which is essentially unaffected by humidity when a desiccant cartridge as described above is placed upstream of the charcoal.

Referring now specifically to FIG. 11, there will be seen a curve of uptake of radon by RFE devices. Individual plastic canisters containing 2.0 activated charcoal and having grid openings at both ends (described in the text) allowing free passage of forced air, were exposed to airborne radon at 23° C. for increasing periods of time as shown. An electrically driven air pump propelling 2.4 liter of air per minute was attached via rubber tubing to the individual plastic canisters during this test. Subsequently the charcoal from each canister was placed in a LSC vial together with 15 ml LSC solution containing 10 ml xylene and 5 ml Exonofluor. Radioactivity levels were monitored following LSC sample equilibration (3 hr, room temperature). The plateau cpm levels of radioactivity in this experiment were compared with those obtained following exposure of identical canisters to a known controlled level of radon obtained from a test chamber (100p Ci/1 radon). The ratio of the experimental cpm values to the test chamber control values, multiplied by 100p Ci/1 gave the actual level of radon in the ambient environment.

FIG. 12 shows the effect of humidity on adsorbed level of radon in activated charcoal. Plastic canisters containing 2.0 g activated charcoal were equilibrated with airbone radon as in FIG. 1 under conditions of low relative humidity (10-20%). No moisture uptake was detected under these conditions as evidenced by weighing the charcoal before and after the 10 minute exposure periods to forced ambient air. Subsequently the same ambient air was saturated with water vapor before passing through the charcoal canister. Individual equilibrated canisters described above were then exposed to this moist air for increasing periods of time. The levels of radon retained by the charcoal were measured (by LSC) and the data then plotted as a function of weight fraction water uptake by the charcoal. This curve establishes that approximately 3.0% radon is lost for each 1.0% gain in weight by the charcoal due to moisture.

SPECIFIC CONSTRUCTION OF ACTIVE RADON DETECTORS

Figure 13:
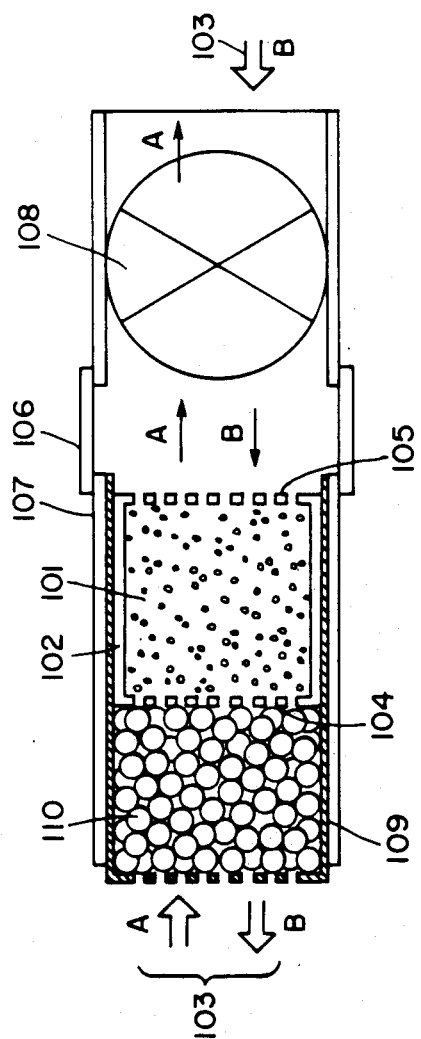
FIG. 13 is a sectional view of an active sampling device for radon based on the technology in the preceding passive diffusion devices.

An embodiment of an active "grab" sampling device for radon will be seen in FIG. 13. These devices consist of beds of granular radon adsorbent such as charcoal 101 packaged in a container 102 which is substantially gas permeable, allowing airborne radon 103 to flow directly and continuously through the entire bed of adsorbent 101. In these embodiments a direct air flow 103 travels through both permeable sides 104 and 105 of the adsorbent container. Air-tight adapters 106 and tubing 107 may be used to connect the container 102 to the air pump 108 to assure that all of the pump-propelled airbone radon 103 passes through the adsorbent 101.

The air pump 108 may be positioned downstream from the adsorbent producing a partial vacuum (A) to propel airbone radon through the adsorbent or alternatively upstream from the adsorbent producing positive pressure (B) to propel the airbone radon. An additional container 109 holding granular desiccant 110 may be placed in "series" (referring to gas flow A) from the radon adsorbent 101 so that all of the radon-bearing air 103 is forced to pass through the desiccant 110 before passing through the radon adsorbent 101. For gas flow B, the containers 102 and 109 are positioned in reverse order relative to the air pump 108. An optional hollow probe tube (not shown) may be attached to the air input of this device to facilitate accessing and sampling airborne radon in confined spaces, cracks in walls and other hard to reach places.

I claim:

1. A radon detection device comprising:
    an equilibrium adsorption material for monitoring radon level,
    a gas permeable holding means for said adsorption material,
    an air pump for propelling ambient atmosphere through said adsorption material positioned in said holding means, and
    a gas flow connecting means by which said ambient atmosphere flows through said air pump connected to said adsorption material.

2. A radon detection device according to claim 1 wherein a desiccant material and desiccant holding means are included in said device to remove ambient moisture from the pumped atmosphere and wherein said desiccant and said holding means are connected in series with and upstream with respect to the flow of the atmosphere.

3. A detection device according to claim 1 wherein said adsorption material is activated charcoal.

4. A detection device according to claim 2 wherein said desiccant is silica gel or anhydrous $CaSO_4$.

5. A detection device according to claim 1 wherein said adsorption material is activated charcoal and said charcoal is in the form of granules whose average diameter is greater than 0.5 mm and less than 5 mm.

6. A detection device according to claim 1 wherein said holding means is a walled container having porous or mesh-like ends wherein said pores or mesh holes are sufficiently large to allow rapid continuous gas flow and sufficiently small to prevent the charcoal from exiting through said pores or mesh holes.

7. A radon detection device comprising:
an equilibrium adsorption material for monitoring radon level,
a gas permeable holding means for said adsorption material,
an air pump for propelling ambient atmosphere through said adsorption material positioned in said holding means,
a desiccant material and desiccant holding means to remove ambient moisture from the pumped atmosphere,
said holding means being connected in series with and upstream with respect to the flow of the atmosphere, and
a gas flow connecting means by which said ambient atmosphere flows through said air pump connected to said adsorption material.

8. A method for the active sampling of radon including the steps of:
assembling a container of equilibrium adsorption material,
placing said container within a building or other finite volume of air,
forcing said air through said container for a period of time sufficient to equilibrate the radon adsorbent in said container with respect to the radon in said air, and
counting the radioactivity in said adsorption material.

9. The method of claim 8 wherein the radioactivity from said adsorbent is detected using liquid scintillation counting.

10. The method of claim 8 wherein the radioactivity from said adsorbent is detected using gamma ray counting.

11. A passive diffusion device for measuring the radioactive radon concentration in ambient air comprising:
a container in the form of an airtight vial having at least one diffusion opening,
a predetermined amount of radon adsorbent and a desiccant in the container,
the container being translucent to photons produced from liquid scintillant added to the container after the adsorbent has been exposed to ambient air containing radon.

12. A diffusion device according to claim 11 wherein the air-tight vial is a polyolefin.

13. A diffusion device according to claim 11 wherein the air-tight vial has a removable cap.

14. A diffusion device according to claim 11 wherein the adsorbent is in a gas and liquid permeable member with the container.

15. A passive diffusion device for collecting and allowing measurement of the radioactive radon concentration in air, comprising:
an adsorbent of radon within an airtight scintillation vial, a desiccant in the vial juxtaposed relative to said adsorbent, the vial being translucent to scintillation photons so that said photons, which are a measure of said radon, may be counted by a scintillation counting instrument.

16. The device of claim 15 wherein the desiccant is effective in reducing moisture, being effective both in free granular form as well as in porous packaged form.

17. In a passive diffusion device for measuring the radioactive radon concentration in ambient air having and adsorbent of radon in a container with one or more diffusion openings, the improvement comprising:
juxtaposing the adsorbent with a desiccant, the desiccant being present in a sufficient quantity to keep the adsorbent substantially moisture-free for between 1 day and 1 week during exposure to radon under relative humidity conditions ranging from 0 to 100%,
the juxtaposed desiccant being placed in close proximity with the adsorbent so that the ambient air, carrying radioactive radon, can enter the adsorbent and the weitht of desiccant is sufficient to remove moisture out of the adsorbent during the periord of exposure of the device to the embient air, and
said desiccant being effective in removing moisture when in both free granular forms as well as porous packaged form.

* * * * *